United States Patent
Long et al.

(10) Patent No.: US 12,366,068 B2
(45) Date of Patent: Jul. 22, 2025

(54) NON-COMBUSTIBLE, NET-ZERO ENERGY BUILDING SYSTEMS

(71) Applicant: KLRH, LLC, Houston, TX (US)

(72) Inventors: Scott Long, Coralville, IA (US); Manoj Krishan, Houston, TX (US)

(73) Assignee: KLRH, LLC, Houston, TX (US)

( * ) Notice: Subject to any disclaimer, the term of this patent is extended or adjusted under 35 U.S.C. 154(b) by 0 days.

(21) Appl. No.: 18/544,014

(22) Filed: Dec. 18, 2023

(65) Prior Publication Data

US 2024/0117633 A1  Apr. 11, 2024

Related U.S. Application Data

(62) Division of application No. 17/982,428, filed on Nov. 7, 2022, now Pat. No. 11,885,132.

(60) Provisional application No. 63/344,757, filed on May 23, 2022.

(51) Int. Cl.
| | | |
|---|---|---|
| *E04B 1/74* | (2006.01) | |
| *B32B 3/26* | (2006.01) | |
| *B32B 7/08* | (2019.01) | |
| *B32B 13/02* | (2006.01) | |
| *E04B 2/00* | (2006.01) | |
| *E04C 2/288* | (2006.01) | |

(Continued)

(52) U.S. Cl.
CPC ............ *E04C 2/2885* (2013.01); *B32B 3/266* (2013.01); *B32B 7/08* (2013.01); *B32B 13/02* (2013.01); *E04C 2/46* (2013.01); *E04C 5/073* (2013.01); *E04C 5/12* (2013.01); *B32B 2250/03* (2013.01); *B32B 2250/40* (2013.01); *B32B 2262/0253* (2013.01); *B32B 2307/304* (2013.01); *B32B 2307/514* (2013.01); *B32B 2307/54* (2013.01); *B32B 2307/732* (2013.01); *B32B 2607/00* (2013.01)

(58) Field of Classification Search
CPC .............................. B32B 3/266; E04C 2/2885
See application file for complete search history.

(56) References Cited

U.S. PATENT DOCUMENTS

| | | |
|---|---|---|
| 1,566,228 A | 12/1925 | Ryan |
| 3,534,518 A | 10/1970 | Zagray |

(Continued)

OTHER PUBLICATIONS

General Insulation Company Inc. [online], "Hunter XCi Concast Wall Panel," available on or before May 16, 2021, via Internet Archive: Wayback Machine URL<http://web.archive.org/web/20210516152442/https://www.generalinsulation.com/products/building-envelope/wall-panels/hunter/hunter-xci-concast-wall-panel/>, retrieved on Nov. 8, 2022, URL<https://www.generalinsulation.com/products/building-envelope/wall-panels/hunter/hunter-xci-concast-wall-panel/>, 3 pages.

(Continued)

*Primary Examiner* — Basil S Katcheves
(74) *Attorney, Agent, or Firm* — Fish & Richardson P.C.

(57) ABSTRACT

Methods, systems, and apparatus for constructing a wall panel and building are disclosed. The wall panel can include: fiber-reinforced concrete layers including concrete with interwoven fibrous materials; an insulation layer; and a connector. The insulation layer is sandwiched between the fiber-reinforced concrete layers, and the connector extends through the insulation layer and concrete layers to create composite action between the insulation layer and the concrete layers.

20 Claims, 11 Drawing Sheets

(51) Int. Cl.
    *E04C 5/07*     (2006.01)
    *E04C 5/12*     (2006.01)

(56) References Cited

U.S. PATENT DOCUMENTS

| | | | | |
|---|---|---|---|---|
| 3,922,413 | A | * | 11/1975 | Reineman .................. B32B 3/26 |
| | | | | 52/576 |
| 4,069,629 | A | * | 1/1978 | Piazza ................... E04B 1/4121 |
| | | | | 52/309.4 |
| 4,084,362 | A | | 4/1978 | Piazza |
| 4,232,494 | A | | 11/1980 | Bauch |
| 4,233,787 | A | | 11/1980 | Piazza |
| 4,292,783 | A | | 10/1981 | Mulvihill |
| 4,628,653 | A | | 12/1986 | Nash |
| 4,688,362 | A | | 8/1987 | Pedersen |
| 4,774,794 | A | | 10/1988 | Grieb |
| 4,942,702 | A | | 7/1990 | Lemasson |
| 4,974,381 | A | | 12/1990 | Marks |
| 5,230,191 | A | | 7/1993 | Mayrand |
| 5,248,122 | A | | 9/1993 | Graham |
| 5,440,846 | A | | 8/1995 | Record |
| 5,697,189 | A | * | 12/1997 | Miller .................... E04C 2/2885 |
| | | | | 52/794.1 |
| 5,913,789 | A | | 6/1999 | Varre |
| 5,966,896 | A | | 10/1999 | Tylman |
| 6,006,480 | A | | 12/1999 | Rook |
| 6,026,628 | A | | 2/2000 | Lopez |
| 6,185,890 | B1 | | 2/2001 | Ritter |
| 6,418,686 | B1 | | 7/2002 | Record |
| 7,062,885 | B1 | | 6/2006 | Dickenson, Jr. |
| 7,165,374 | B2 | | 1/2007 | Ohanesian |
| 7,237,366 | B2 | | 7/2007 | Donahey et al. |
| 7,849,650 | B2 | | 12/2010 | Tonyan et al. |
| 8,800,230 | B2 | | 8/2014 | O'Connor |
| 8,844,227 | B1 | | 9/2014 | Ciuperca |
| 8,877,329 | B2 | * | 11/2014 | Ciuperca ................ B32B 13/12 |
| | | | | 52/424 |
| 9,234,349 | B1 | | 1/2016 | Daiber |
| 10,648,176 | B2 | | 5/2020 | Olarte Michel |
| 11,885,132 | B2 | * | 1/2024 | Long ...................... E04C 2/46 |
| 2001/0045077 | A1 | | 11/2001 | Miller |
| 2004/0065034 | A1 | * | 4/2004 | Messenger ............ E04C 2/2885 |
| | | | | 52/309.11 |
| 2004/0206032 | A1 | | 10/2004 | Messenger |
| 2007/0107346 | A1 | | 5/2007 | Fleischhacker |
| 2007/0199266 | A1 | | 8/2007 | Geilen |
| 2008/0115442 | A1 | | 5/2008 | Cheng |
| 2008/0276559 | A1 | * | 11/2008 | Messenger ................ E04B 5/48 |
| | | | | 52/745.19 |
| 2011/0305868 | A1 | * | 12/2011 | Heytens .................. E04B 1/803 |
| | | | | 428/116 |
| 2013/0061549 | A1 | * | 3/2013 | Biadora .................... E04B 2/12 |
| | | | | 52/582.1 |
| 2014/0087158 | A1 | | 3/2014 | Ciuperca |
| 2014/0273687 | A1 | | 9/2014 | Garvey |
| 2017/0350122 | A1 | | 12/2017 | Foderberg |
| 2018/0058081 | A1 | | 3/2018 | Hansort |
| 2019/0093343 | A1 | * | 3/2019 | Dimitrakopoulos ...... B32B 3/08 |
| 2019/0383045 | A1 | | 12/2019 | Kelly |
| 2020/0392731 | A1 | * | 12/2020 | Sloane ...................... E04C 2/46 |
| 2021/0323879 | A1 | * | 10/2021 | Luo ........................ C04B 28/065 |
| 2022/0049497 | A1 | * | 2/2022 | Dombowsky ......... E04C 2/2885 |

OTHER PUBLICATIONS

International Search Report and Written Opinion in International Appln. No. PCT/US2022/052301, mailed on Mar. 24, 2023, 19 pages.

PolyMolding.com [online], "EPS Foam Used as Insulation in Precast Concrete Wall Panels," Feb. 15, 2017, retrieved on Nov. 8, 2022, retrieved from URL<https://www.polymoldingllc.com/eps-foam-used-as-insulation-in-precast-concrete-wall-panels/>, 5 pages.

Solarcrete.com [online], "Solarcrete's Insulated Concrete Wall," available on or before Mar. 18, 2005, via Internet Archive: Wayback Machine URL<http://web.archive.org/web/20050318205553/https://www.solarcrete.com/insulated-concrete-wall.php>, retrieved on Nov. 8, 2022, URL<https://www.solarcrete.com/insulated-concrete-wall.php>, 1 page.

TiltWall.com [online], "The Technical Aspects of Concrete Sandwich Panels Explained," Nov. 28, 2017, retrieved on Nov. 8, 2022, retrieved via Internet Archive: Wayback Machine URL<http://web.archive.org/web/20200921041248/https://www.tiltwall.ca/blog/the-technical-aspects-of-concrete-sandwich-panels-explained/>, URL<https://www.tiltwall.ca/blog/the-technical-aspects-of-concrete-sandwich- panels-explained/>, 7 pages.

International Preliminary Report on Patentability in International Appln. No. PCT/US2022/052301, mailed on Dec. 5, 2024, 12 pages.

* cited by examiner

```
                    ┌─ 1210
┌─────────────────────────────────────────────┐
│ Form a first sandwich wall panel from a     │
│ first preset mold and a second sandwich     │
│ wall panel from a second preset mold,       │
│ where each of the first and second sandwich │
│ wall panels include:                        │
│ two fiber-reinforced concrete layers an     │
│ insulation layer between the two fiber-     │
│ reinforced concrete layers; at least one    │
│ connector extending through the insulation  │
│ layer and concrete layers; and a solid      │
│ fiber-reinforced concrete section           │
└─────────────────────────────────────────────┘
```

```
                    ┌─ 1220
┌─────────────────────────────────────────────┐
│ Bolt the first sandwich wall panel to the   │
│ second sandwich wall panel by drilling at   │
│ least one large diameter tapcon anchor      │
│ through the solid fiber-reinforced concrete │
│ sections of the first and second sandwich   │
│ wall panels                                 │
└─────────────────────────────────────────────┘
```

```
                    ┌─ 1230
┌─────────────────────────────────────────────┐
│ Position a first set of wall panels at a    │
│ first elevation, where the first set of     │
│ wall panels includes the first sandwich     │
│ wall panel and the second sandwich wall     │
│ panel                                       │
└─────────────────────────────────────────────┘
```

```
                    ┌─ 1240
┌─────────────────────────────────────────────┐
│ Install a floor over the first set of wall  │
│ panels                                      │
└─────────────────────────────────────────────┘
```

```
                    ┌─ 1250
┌─────────────────────────────────────────────┐
│ Lift and position a second set of wall      │
│ panels over the first set of wall panels at │
│ a second elevation higher than the first    │
│ elevation                                   │
└─────────────────────────────────────────────┘
```

```
                    ┌─ 1260
┌─────────────────────────────────────────────┐
│ Install a roof over the second set of wall  │
│ panels                                      │
└─────────────────────────────────────────────┘
```

FIG. 12

NON-COMBUSTIBLE, NET-ZERO ENERGY BUILDING SYSTEMS

CROSS REFERENCE TO RELATED APPLICATION

This application is a divisional of U.S. application Ser. No. 17/982,428 filed Nov. 7, 2022, which claims the benefit of U.S. Provisional Application No. 63/344,757, filed on May 23, 2022, the contents of which are incorporated by reference herein.

TECHNICAL FIELD

The present disclosure generally relates to non-combustible building systems in the residential and commercial construction industry.

BACKGROUND

Problems with traditional building materials and processes arise relating to fire damage and energy efficiency in residential and commercial structures, both of which represent major concerns throughout the construction industry generally and in the state of California specifically. In addition to direct fire exposure, heat of combustion at 600 degrees Fahrenheit can cause building structures to ignite, and because traditional wood materials are highly flammable and combustible, these materials generally provide little protection to prevent a structure from burning.

No current solutions have completely addressed these problems. Some attempted solutions include simple mitigation tactics such as thickened stucco, closing off vents, and keeping brush away from homes, but these solutions focus on mitigation of direct fire exposure rather than fire and combustion resistance and prevention. Other solutions have attempted to use concrete rather than lumber for building walls, but concrete is a heavy material and susceptible to cracking. Some concrete solutions attempt to place an insulation layer between thick layers of concrete, but these thick concrete layers generally require steel reinforcements, which makes the concrete even heavier and more expensive. A need exists for a lightweight, cost-efficient solution that provides fire and combustion resistance and energy efficiency to residential and commercial building structures.

SUMMARY OF THE DISCLOSURE

The present disclosure describes an insulated concrete wall panel for residential and commercial structures. The systems described herein may be used for preventing structural fire and combustion damage and, additionally, for providing energy-efficient and net-zero energy results to residential and commercial buildings.

Embodiments of the present disclosure present a sandwich wall panel with an insulation layer between two layers of concrete. Unlike prior sandwich wall configurations that use steel-reinforced concrete for the outer layers, the present disclosure describes the use of fiber-reinforced concrete, which is lighter, stronger, and more fire resistant. It is known throughout the construction industry that concrete has high strength under compression but relatively low strength under tension.

Large masses of concrete (such as concrete slabs, foundations, or wall panels) often require reinforcements to help the concrete maintain its form, especially when exposed to tension. Traditionally, steel cages have been used to reinforce concrete, but the steel reinforcements add weight to the concrete and require thickening of the concrete to protect the steel against rust and corrosion. Conversely, the present disclosure describes mixing fibrous materials (e.g., glass fibers, polypropylene, nylon) with concrete to produce a fiber-reinforced concrete composite material. The addition of fibers interwoven and embedded within the concrete provides numerous benefits discussed below, including tensile strength, lighter weight, fire resistance, and energy efficiency.

In general, innovative aspects of the subject matter described in this specification can be embodied in a wall panel that includes: at least two fiber-reinforced concrete layers including concrete with interwoven fibrous materials; an insulation layer; and a connector. The insulation layer is sandwiched between the at least two fiber-reinforced concrete layers, and the connector extends through the insulation layer and concrete layers to create composite action between the insulation layer and the concrete layers. Other implementations of this aspect include corresponding systems, apparatus, and methods.

In another general aspect, innovative aspects of the subject matter described in this specification can be embodied in methods that include actions of: providing a preset mold having a length in a first lateral dimension and a width in a second lateral dimension; forming a first concrete layer by pouring a wet concrete mix containing fibrous material into the preset mold; while the concrete mix is still wet, installing an insulation layer and one or more connectors such that the insulation layer and connectors embed into the first concrete layer in the preset mold; forming a second concrete layer by pouring the concrete mix containing fibrous material over the insulation layer and the connectors in the preset mold; and allowing the first and second concrete layers to dry such to form a sandwich wall panel with composite action between the first and second concrete layers, the insulation layer, and the connectors. A length of the insulation layer is less than the width of the preset mold, a width of the insulation layer is less than the width of the present mold, or both.

In another general aspect, innovative aspects of the subject matter described in this specification can be embodied in a building system that includes: multiple wall panels, each wall panel including a first concrete layer and a second concrete layer, each including fiber-reinforced concrete including concrete embedded with interwoven fibrous materials; an insulation layer disposed between the first concrete layer and the second concrete layer; multiple connectors spaced throughout the wall panel, each connector extending from the first concrete panel through the insulation layer and into the second concrete panel; a lifting anchor embedded in a first region at an upper end of the wall panel at which the insulation layer is recessed, thereby forming a first area of solid fiber-reinforced concrete extending between the first and second concrete layers; and a second region at a lower end of the wall panel at which the insulation layer is recessed, thereby forming a second area of solid fiber-reinforced concrete extending between the first and second concrete layers, the second region sized to accept at least two tapcon anchors. A perimeter edge of the insulation layer is inset from respective perimeter edges of the first and second concrete layers and an entirety of the perimeter edge of the insulation layer is covered by a cap of fiber reinforced concrete.

In another general aspect, innovative aspects of the subject matter described in this specification can be embodied in methods that include actions of forming a first sandwich wall panel from a first preset mold and a second sandwich wall panel from a second preset mold; and bolting the first sandwich wall panel to the second sandwich wall panel by drilling at least one large diameter tapcon anchor through the solid fiber-reinforced concrete sections of the first and second sandwich wall panels. Each of the first and second sandwich wall panels include: two fiber-reinforced concrete layers; an insulation layer between the two fiber-reinforced concrete layers; at least one connector extending through the insulation layer and concrete layers; and a solid fiber-reinforced concrete section.

These and other implementations can each optionally include one or more of the following features.

In some implementations, the fiber-reinforced concrete layers are no greater than approximately two inches thick.

In some implementations, the insulation layer is at least approximately four inches thick.

In some implementations, the fiber-reinforced concrete layers include polypropylene fibers, polyethylene fibers, or both.

In some implementations, the wall panel includes a solid concrete section covering the insulation layer. In some implementations, the solid concrete section includes fiber-reinforced concrete material. In some implementations, the solid concrete section includes at least one large diameter tapcon anchor.

In some implementations, the fibrous materials in the concrete layers are configured to form air pockets when exposed to heat.

In some implementations, the wall panel does not include reinforcing steel materials.

In some implementations, the wall panel includes a solid fiber-reinforced concrete section having no insulation layer. In some implementations, the solid concrete section includes at least one large diameter tapcon anchor.

In some implementations, the preset mold includes an opening. In some implementations, the actions include forming a window or a door in the sandwich wall panel from the opening in the preset mold.

In some implementations, the actions include lifting the sandwich wall panel from the preset mold.

In some implementations, the sandwich wall panel includes a solid fiber-reinforced concrete section.

In some implementations, the actions include adding a fiber-reinforced concrete section over the insulation layer such that the solid concrete section fully covers the insulation layer.

In some implementations, the length of the insulation layer is two inches less than the length of the preset mold, the width of the insulation layer is two inches less than the width of the preset mold, or both.

In some implementations, the preset mold has a length in a first lateral dimension and a width in a second lateral dimension, and where a length of the insulation layer is less than the width of the preset mold, a width of the insulation layer is less than the width of the present mold, or both.

In some implementations, the first concrete layer does not include steel reinforcements that extend completely within a plane defined by the first concrete layer. The second concrete layer does not include steel reinforcements that extend completely within a plane of the second concrete layer.

In some implementations, at least one of the wall panels includes a conduit box embedded within the first concrete layer and conduit connected to the conduit box embedded within the first concrete layer.

In some implementations, the actions include: positioning a first set of wall panels at a first elevation; after positioning the first set of wall panels, installing a floor over the first set of wall panels; after installing the floor, lifting and positioning a second set of wall panels over the first set of wall panels at a second elevation higher than the first elevation; and after lifting and positioning the second set of wall panels, installing a roof over the second set of wall panels. The first set of wall panels includes the first sandwich wall panel and the second sandwich wall panel.

Particular implementations of the subject matter described in this specification can be implemented so as to realize one or more of the following advantages.

High-strength concrete is non-flammable and non-combustible, providing superior fire resistance over conventional wood materials. Further, high-mass concrete with an insulation core stores and releases thermal energy allowing for lower use of HVAC systems to maintain desired temperature, thus providing a more affordable net-zero energy result.

BRIEF DESCRIPTION OF THE DRAWINGS

FIG. 12 is a flow diagram of a process 1200 for constructing a building

DETAILED DESCRIPTION OF THE DISCLOSURE

Embodiments of the present disclosure include unique building systems with fiber-reinforced, insulated concrete wall panels for fire and combustion protection and energy efficiency.

Figure 1:
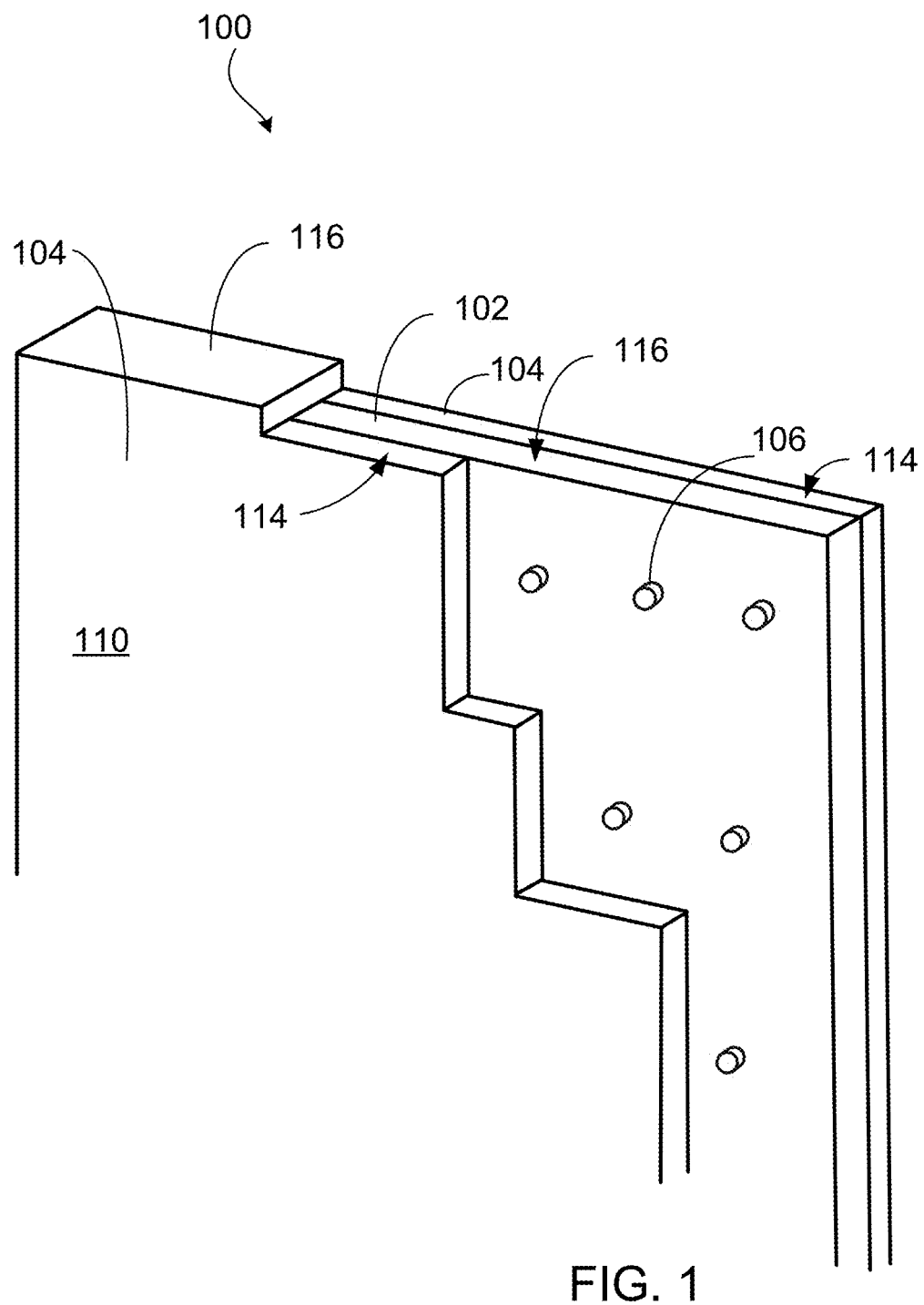
FIG. 1 is a perspective cutaway view of an exemplary embodiment of a wall panel configuration according to the present disclosure. The embodiment shown includes an insulation layer sandwiched between two concrete layers with multiple connectors joining the wall layers.
Figure 2:
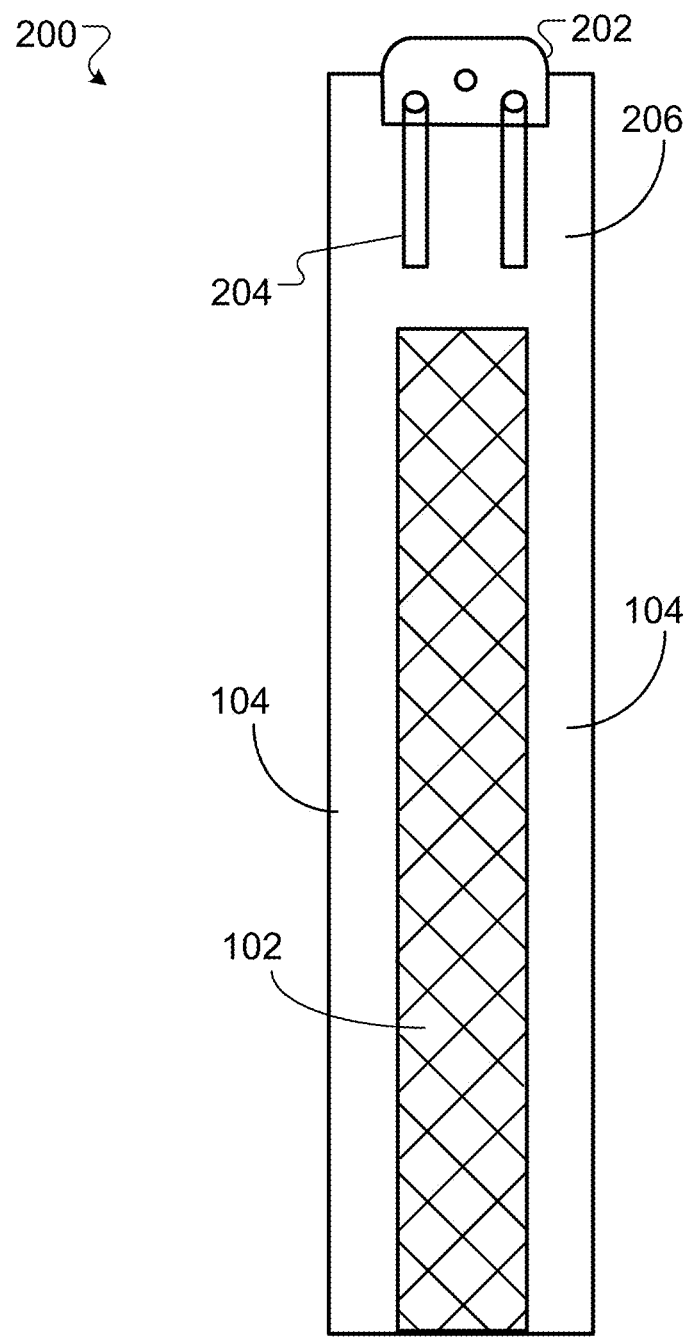
FIG. 2 is sectional end view of one embodiment of a wall panel configuration according to the present disclosure.

FIG. 1 is a perspective cutaway view of one embodiment of a wall panel configuration 100 according to the present disclosure. The embodiment shown includes an insulation layer 102 sandwiched between two concrete layers 104 with multiple connectors 106 spaced throughout the wall panel configuration 100. The connectors 106 join the wall layers by extending from the first concrete layer to the second concrete layer. FIG. 2 is sectional end view of one embodiment of a wall panel configuration 200 according to the present disclosure.

Some embodiments may include a structural composite wall panel configuration with multiple layers functioning as a single wall. Some sections of the wall panel configuration 100 include an insulation layer 102 sandwiched between two concrete layers 104 on either side, as shown in FIG. 1. In other sections, the wall panel may be solid concrete without an insulation layer. In some embodiments, the insulation layer 102 may have a certain thickness (e.g., at least approximately four inches) and each concrete layer 104 may have a certain thickness (e.g., approximately two inches or less), forming, for example, a 2"-4"-2" wall panel configuration 200, as shown in FIG. 2. The sandwich wall panels may include connectors 106 through the layers that create composite action between the layers (e.g., binding the layers together so strongly that they act together structurally as a single unit). The combination of composite materials creates a composite mold effect, meaning that the combination of the composite connectors 106 with the interwoven composite reinforcing fibers work together structurally once a bonding agent (e.g., solid concrete 206) is applied. In some embodiments, the majority of the wall panel material is composite material (e.g., approximately 70% composite material and approximately 30% concrete). Note that while two layers of concrete are illustrated in FIGS. 1-2, the insulation layer 102 may be sandwiched between more than two layers of concrete and more than one insulation layer may be present.

The solid concrete 206 can allow for sturdy sections of the wall panel for providing the structural inserts for lifting and attaching the panels during the assembly of a building. In some implementations, the "top", e.g., area of a wall panel that will be highest after assembly, can include structural attachment points, e.g., a lifting anchor, recessed in the solid concrete 206 regions of the wall panel 200 that do not include the insulating layer 102. The lifting anchor can be metal tabs with a loop at the edge of the wall panel with a hook cabling, facilitate the lifting of the wall panel. The "bottom", e.g., the area of the wall panel that will be lowest after assembly, can have attachment anchors in the solid concrete 206. In some implementations, the attachment anchors ring clutches than can allow for a range in orientations of wall panels as they are lifted and assembled.

The presence of solid concrete 206 around the perimeter of the wall panel can also prevent fire or water penetration to the insulation layer 102 or interior of the assembled building. This solid concrete perimeter can improve the safety and stability of a home, for example, compared to homes with exposed insulation.

Standard concrete used in home construction generally has an ideal temperature range, given that concrete is prone to cracking at extreme temperatures, e.g., greater than 120° F. and less than 10° F., given its differing coefficients of expansion and contraction. The disclosed combination of composite material, e.g., the fiber-reinforced concrete, on the other hand, is less likely to crack under extreme conditions, such as fluctuating temperatures in extreme climates, large temperature differentials between the inside and outside of the building, and tensile or compressive stress and strain.

The presence of the composite connectors 106 can have beneficial effects for the structural stability of a building, such as transferring load in deflection and shear stress from one layer concrete to another layer concrete. For example, during an earthquake, the force on the building from the ground shaking can be transferred from one layer concrete to another, preventing one particular layer from surpassing a threshold force that causes damage. In some implementations, the composite connectors 106 are fiber-reinforced rebar.

FIG. 1 also shows an optional solid concrete section 110 on the top of the wall panel. The solid concrete section 110 can have a certain thickness (e.g., approximately two inches thick or less) and can run along the entire length of all panel edges where the insulation layer 102 would be exposed. The solid concrete section 110 may protect the insulation layer 102 from combustion or direct fire exposure and seal the walls from water damage and moisture so that no water or moisture reach and damage the insulation layer 102. The solid concrete section 110 can be made from similar concrete mix discussed above containing fibrous material, which provides additional strength and prevention of thermal cracking.

In some embodiments, the concrete layers 104 are made from a fiber-reinforced concrete composite material, which avoids the need to use heavier steel reinforcements. The fibers are interwoven into the concrete and can include, but are not limited to, polypropylene, polyethylene macro fibers, or a combination thereof. Additionally, the insulation layer 102 can be, but is not limited to, a foam material such as extruded polystyrene.

Reinforcing the concrete allows the concrete layers 104 to be thinner (e.g., approximately two inches) without losing shape and form, and reinforcing the concrete with fibrous material allows the concrete layers 104 to be lighter-weight than steel-reinforced concrete layers. Despite being thinner and lighter weight, fiber-reinforced concrete is also stronger than steel-reinforced concrete. A lighter-weight wall panel provides numerous benefits during construction such as the ability to use smaller equipment, ship more product per square foot, provide safer working conditions, and lessen the reinforcement needs for the footing system (e.g., less material needed to reinforce a house against slippage in soft ground conditions). Moreover, providing thinner concrete layers allows for a thicker insulation layer 102 within standard wall thickness parameters (e.g., four inches of insulation within a standard eight inch wall panel), which provides increased energy efficiency by preventing heat from transferring from one concrete layer 104 to the other. More specifically, the concrete layers 104 do not have steel reinforcements (e.g., rebar) that extend within the plane defined by the concrete layer 104 and which are completely embedded in the layer. However, as noted above, some embodiments may include composite connectors 106 made of fiber-reinforced rebar that extend between panels 104 in a direction along the thickness of the panels in order to join two panels 104.

Fiber-reinforced concrete is stronger under tension than steel-reinforced concrete. Improved tensile strength provides benefits particularly during shipping and installation, for example, when lifting the panels and preventing the wall panels from bowing under pressure. Further, the reinforcing fibers in the composite concrete material create air pockets when exposed to heat and fire, which slows the thermal transfer through the wall panel and provides additional fire and combustion resistance. The fibers also help strengthen the adhesion between the concrete layers 104, insulation layers 102, and adjoining connectors 106, strengthening the composite action in the wall panel.

Lifting anchors 202 can lift wall panel configuration 200. In some implementations, lifting anchors 202 can connect to a portion of the concrete layers 104 through a hairpin rebar 204. In some implementations, the lifting anchors 202 can lift weights as great as several tons, e.g., four tons. In some implementations, each panel may include one or more (e.g., two to four) lifting anchors 202 depending on the weight off the panel, and the lifting anchors can be evenly spaced to keep the panel level. In some implementations, the lifting anchors can be approximately three feet across.

Further, fiber-reinforced concrete provides additional fire-resistance to the wall panel, where the reinforcing fibers create air pockets when exposed to heat and fire, which slows the thermal transfer through the wall.

Figure 4:
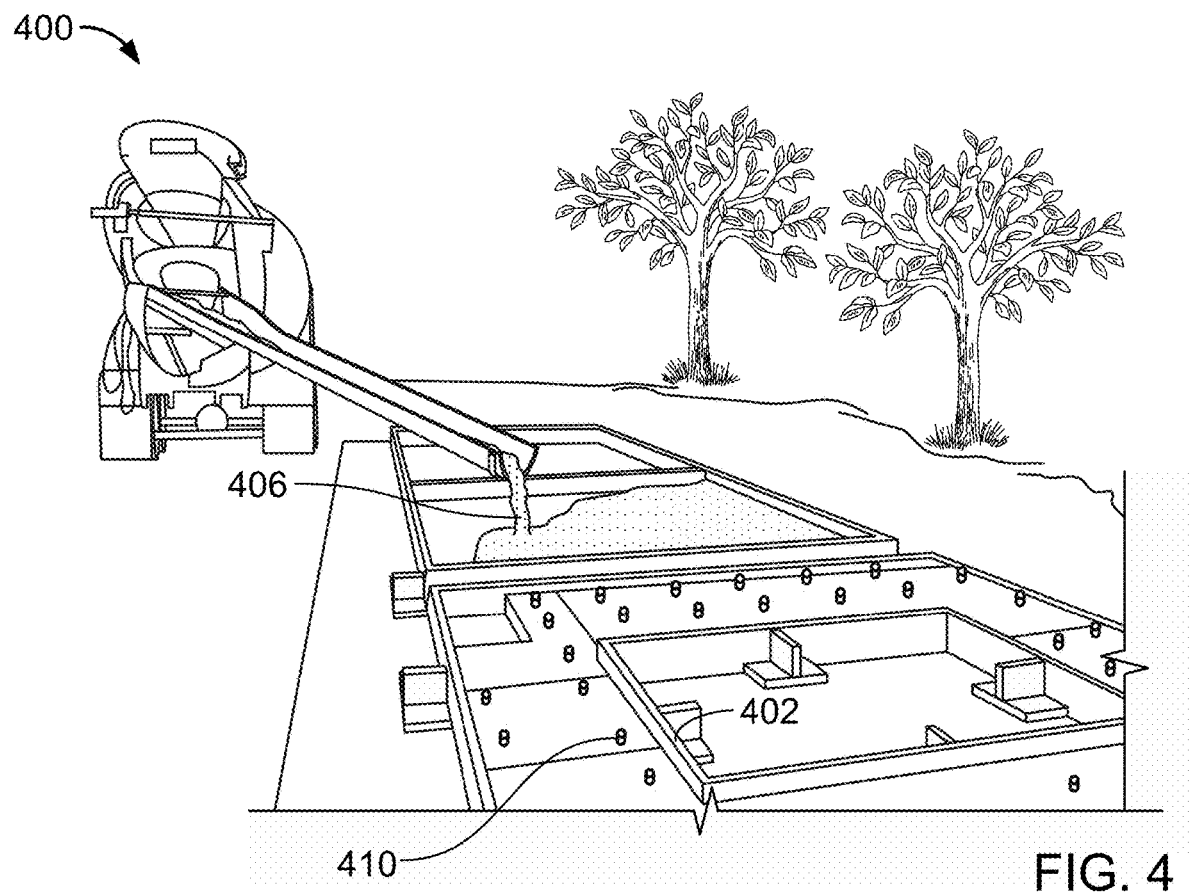
FIGS. 4-6 show onsite molding and lifting processes for manufacturing wall panels according to the present disclosure. A preset mold (e.g., "jig") is shown that can be reused without the need for set-up before each use, which reduces the need for highly skilled onsite labor.
Figure 5:
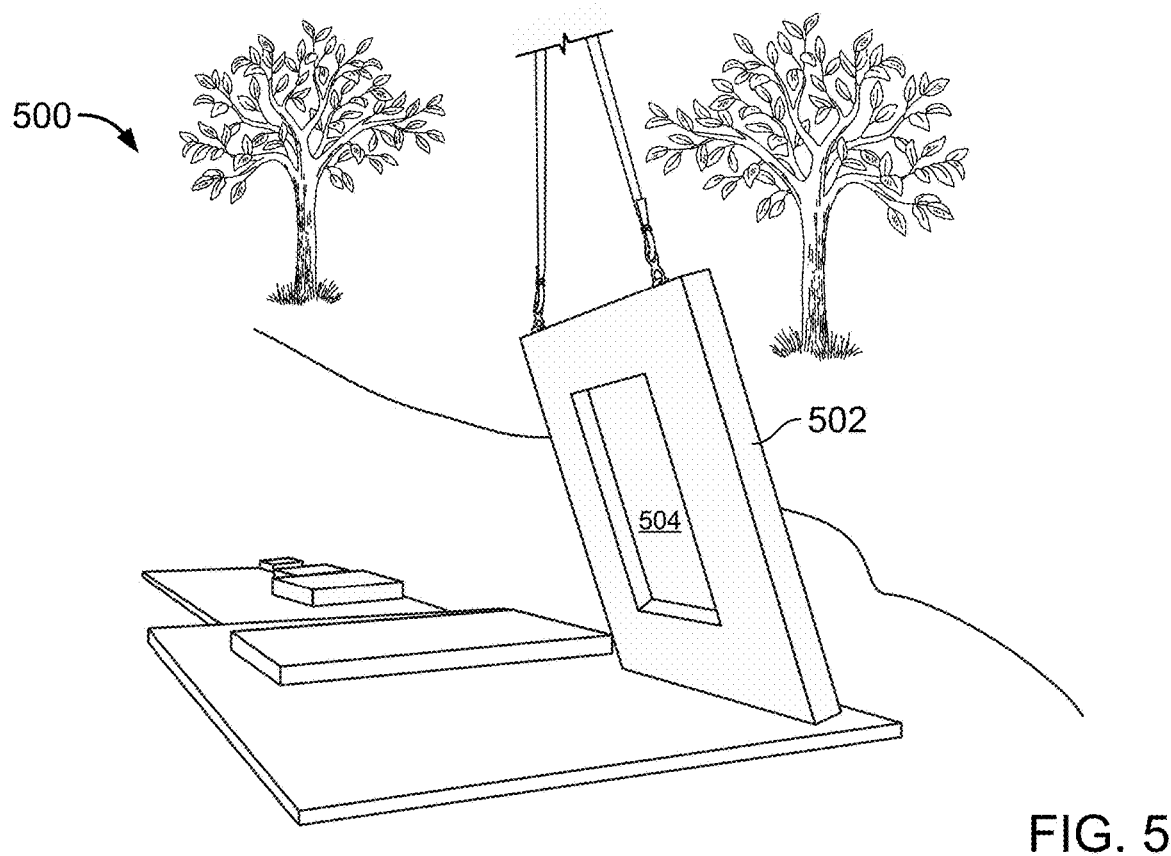
Figure 6:
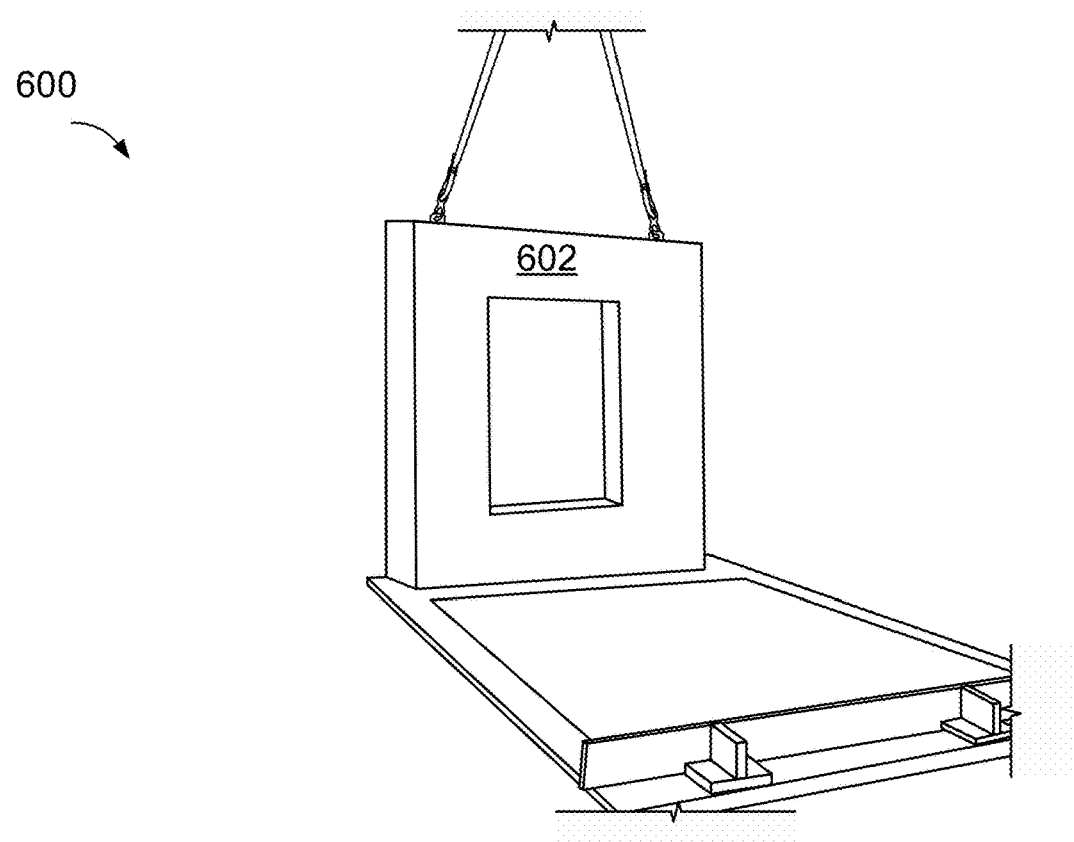

FIGS. 4-6 show onsite molding and lifting processes for manufacturing wall panels according to the present disclosure. A preset mold (e.g., "jig") is shown that can be reused without the need for set-up before each use, which reduces the need for highly skilled onsite labor.

In the home construction industry, wall panels are generally custom-made, e.g., not made with preset molds. The disclosed preset molds can be repeatedly used in a modular fashion. For example, a particular preset mold could be used for any story of the house or for different floor layouts. The molds can be made from steel, concrete, composite, or a combination thereof. In some implementations, wall panels are formed by pouring fiber concrete mix, bolting steel together, or a combination of both. In some implementations, the preset molds can be formed by welding steel down.

As shown in FIGS. 3-6, embodiments of the present disclosure also include onsite molding and lifting methods and processes for manufacturing the wall panels disclosed herein. These processes greatly reduce the need for skilled labor by using a preset mold (e.g., a "jig"). These methods standardize the construction process and therefore standardize the wall panels for each respective building.

Figure 11:
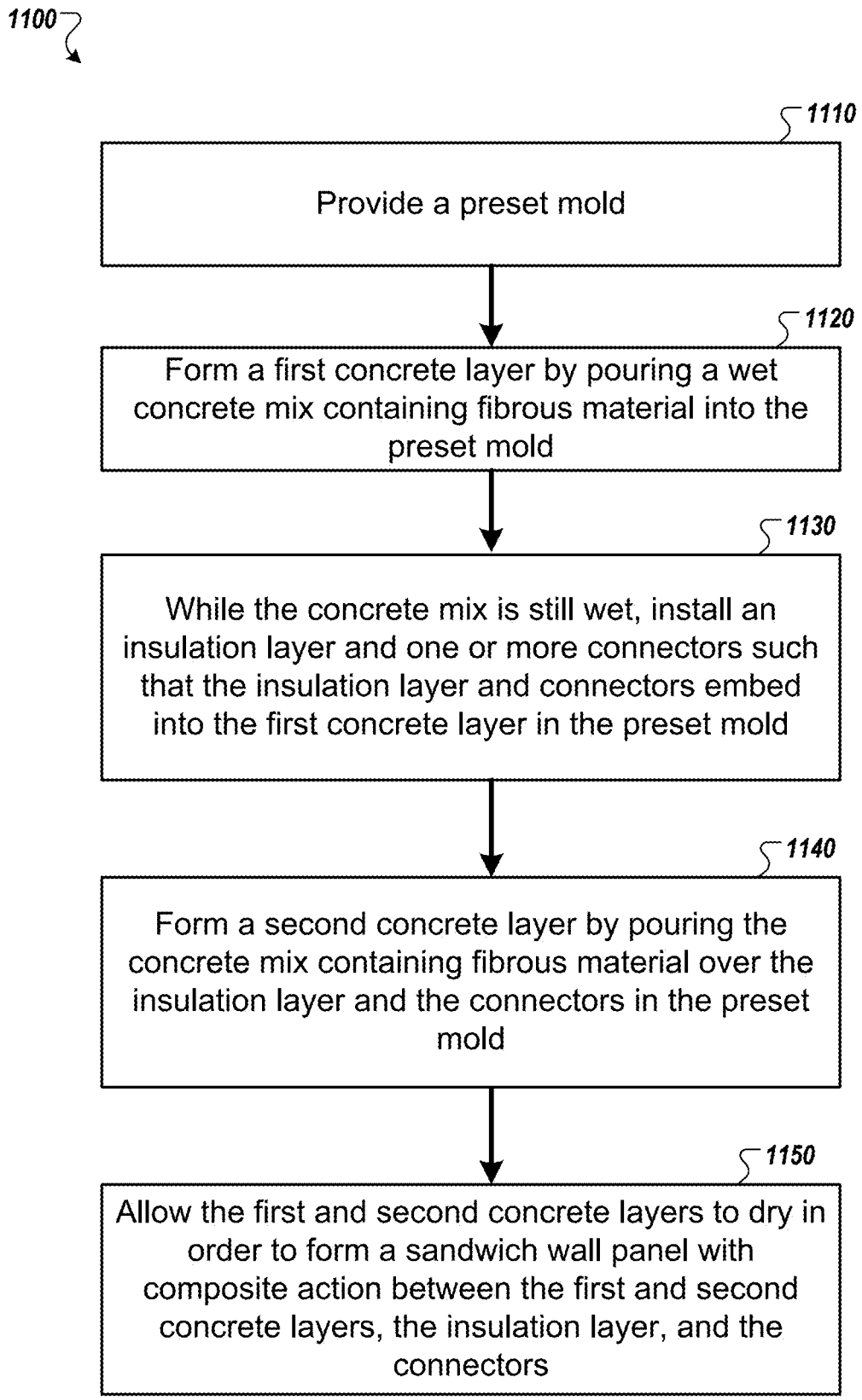
FIG. 11 is a flow diagram of a process for constructing a wall panel.

FIG. 11 is a flow diagram of a process 1100 for constructing a wall panel. For example, a building system 400 (FIG. 4) can perform the process 1100.

The building system 400 can provide a preset mold (1110). In some implementations, the preset mold includes an opening. In some implementations, the preset mold rests on a substantially level plane.

The building system 400 can form a first concrete layer. For example, a concrete layer can be formed by pouring a concrete mix, e.g., concrete mix 406, containing fibrous material into the preset mold, e.g., preset mold 402, as can be seen in FIG. 4 (1120). In some implementations, the concrete mix, being a fluid, flows to fill the total area within the preset mold. Consequently, it can have the same lateral dimensions as the preset mold, e.g., the same height and width in a rectangular preset mold.

In some implementations, the final wall panel will include electrical wiring or sleeves for plumbing. For example, a standard conduit box with one or two outlets can be embedded in the first layer concrete, and conduits, e.g., wires 0.5-0.75 inches in width, can vertically run through the wall panel, such that the conduits of a first and a second wall panel would align in an assembled building. In some implementations, electrical wiring in the wall panel is realized by placing a spacer in the preset mold before pouring the concrete mix. The spacer provides a cavity for standard conduit box. The junction boxes can be added flesh to the surface of the wall panel. In some implementations, a sleeve can be placed within the preset mold before pouring the concrete mix. When the concrete mix dries, the concrete layer includes a cavity through which a plumbing pipe can run. A similar approach can also be used for outdoor hoses.

While the concrete mix is still wet, the building system 400 can install an insulation layer and one or more connectors, e.g., connector 410, such that the insulation layer and connectors embed into the wet concrete in the preset mold 402 (1130). In some implementations, the insulation layer is shorter in one or more dimensions than the first layer concrete, e.g., 97% of the length of the first concrete layer. For example, in a rectangular mold, the length of the insulation layer can be two inches less than the length of the first concrete layer, which can be determined by the length of the preset mold. In more complex shapes, e.g., a pentagon forming the side of the house, the insulation layer can have a similar shape to the preset mold, but have its lateral dimensions scaled down in size. In some implementations, a perimeter edge 112 of the insulation layer can be inset from respective perimeter edges 114 of the first and second concrete layers 104.

Leaving a gap from an insulation layer at this stage in process 1100 can lead to forming a gap in height between the top of the insulation layer and the first layer of concrete at the edges of the preset mold. In some implementations, this gap is filled by concrete in the process 1100. The concrete that fills in this gap can form a perimeter around the wall panel.

The thickness of the insulation layer can depend on the environment and heating or cooling needs of the building for which the wall panel being constructed. In some implementations, the wall panel can provide as much or more insulating effects than a conventional wall panel with continuous barrier insulation, because more of a standard eight inch thick wall can be used for insulation, e.g., thick (approximately four inches) insulation sandwiched by thin (approximately two inches) concrete walls.

The building system 400 can form a second concrete layer by pouring the concrete mix containing fibrous material over the insulation layer and the connectors in the preset mold (1140). In some implementations, the second concrete layer can have substantially the same dimensions as the first concrete layer and be larger than the insulation layer in one or more dimensions.

In implementations where the insulation layer is shorter than the first layer concrete in one or more dimensions, there will be a gap in height between the first concrete layer and insulation layer that is filled with step 1140. The filling in of this gap can create a solid concrete section when the wall panel drives. The solid concrete section formed in this way is less likely to crack compared to how a typical, non-fiber-reinforced concrete would behave in process 1100. Consequently, it is not an industry standard to include a solid concrete perimeter.

The building system 400 can allow the first and second concrete layers to dry in order to form a sandwich wall panel 502 from building system 500 with composite action between the first and second concrete layers, the insulation layer, and the connectors (1150), as can be seen in FIG. 5. In some implementations, the edges of the wall panel can include a solid concrete perimeter. As shown in FIGS. 3-6, openings 504 may be formed in the preset molds 402 to create windows, doors, or other building features.

In some implementations, the process 1100 can include additional steps, fewer steps, or some of the steps can be divided into multiple steps. For example, the building system 400 can form a window in the sandwich wall panel from the opening in the preset mold, a door in the sandwich wall panel from the opening in the preset mold, place electrical wiring within one or more of the layers of concrete, provide sleeves for plumbing through the wall panel, or a combination of two or more of these.

In some implementations, the process 1100 includes lifting the sandwich wall panel from the preset mold. In some implementations, the process 1100 includes forming a fiber-reinforced concrete solid section, e.g., a "cap", where insulation does not connect the layers of concrete, such that the cap 116 fully covers the entirety of the perimeter edge 112 of the insulation layer from the exterior of the wall panel.

Figure 3:
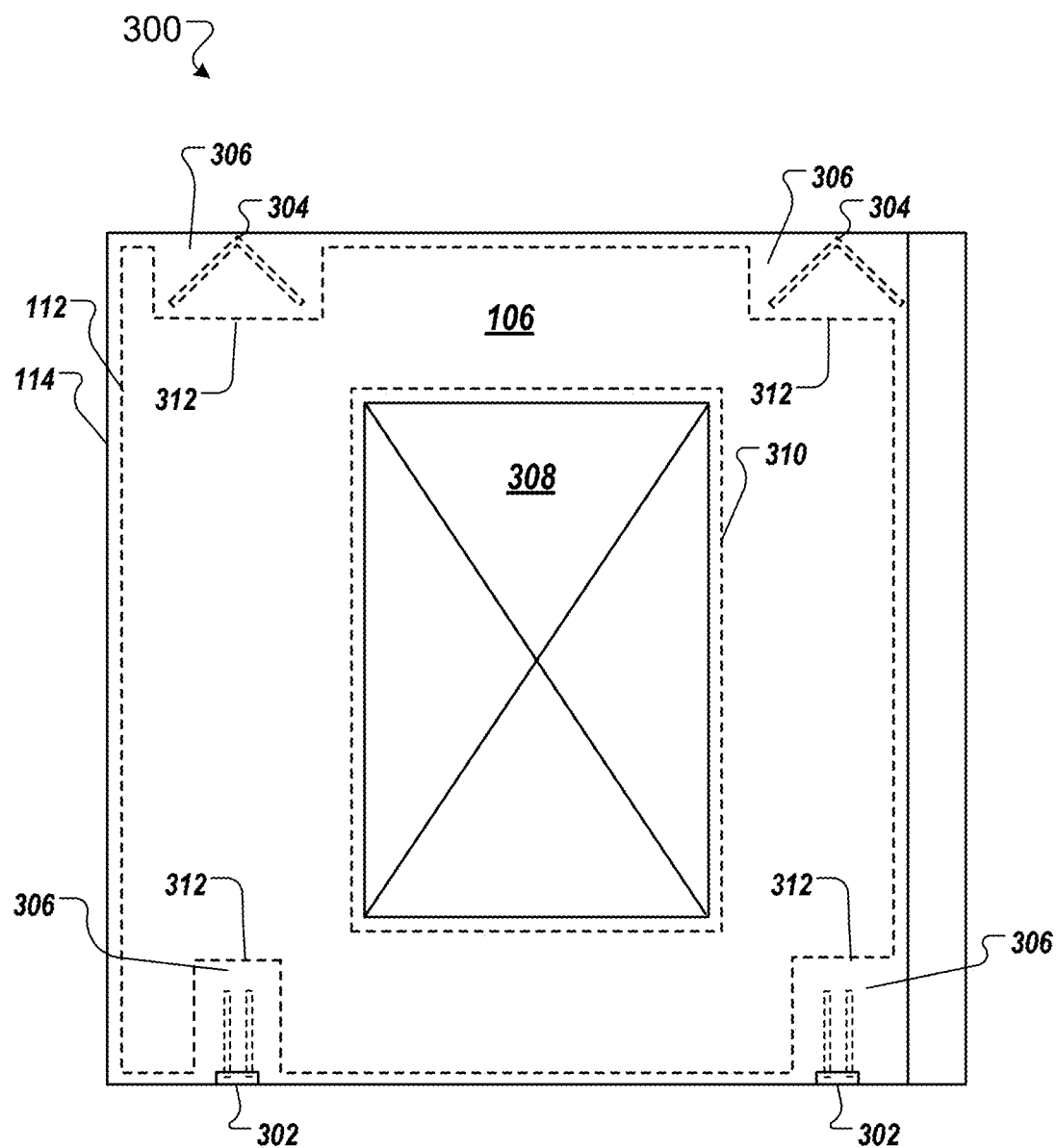
FIG. 3 is sectional front view of one embodiment of a wall panel according to the present disclosure.

FIG. 3 is sectional front view of one embodiment of a wall panel 300 according to the present disclosure. The wall panel 300 can include portions corresponding to slab connections 302, lifting anchors 304, which can be surrounded by solid concrete areas 306 with no foam. The solid concrete areas 306 can be formed in regions where a recess 312 is formed in the insulation layer 106. Solid concrete areas 306 at the bottom of the wall panel 300 can be sized to accept two or more tapcon anchor bolts for slab connections 302. As described above, the outer perimeter edge 112 of the insulating panel 106 can be inset from the outer perimeter edges of the concrete layers 114. In some implementations, openings 308 can be surrounded by areas with hold back foam 310, the perimeter being marked by a dashed line. In some implementations, the wall panel 300 can be approximately ten feet by ten feet. In some implementations, the openings 308 can be windows, e.g., a four feet by six feet window.

As shown in FIGS. 5-6, once dried to the desired amount, the sandwich wall panel 502 may be lifted and erected from the mold to form a section 602 of a building wall.

The processes disclosed herein of casting wall panels with a preset mold allows repeated use of the same mold many times without the need for skilled labor to tear down and set the mold back up, as opposed to traditional construction processes where each panel is different, requiring additional set up, and tear down for molds each time a panel is poured. The processes disclosed herein are more efficient and faster to complete, in part, by the use of fibrous concrete mix as opposed to traditional reinforcing steel because reinforcing steel requires manual installation on lifting chairs and tying the steel together with wire tires.

The process describe herein eliminates the need for structural steel inserts to weld the panels together; rather, embodiments of the present disclosure rely on specifically engineered "solid sections" of concrete, allowing field drilling into the panels and bolting the panels together. In these solid sections, the fibers create structural strength and eliminate the concern of thermal cracking.

The fiber-reinforced wall panels also provide sufficient strength for a wide variety of roofing and flooring options and systems. For example, the wall panels disclosed herein can be used with steel bar joist and decking roofing and flooring systems. Additionally, the wall panels can be used with wood-based systems, steel stud systems, concrete floor and roof planking, and cast in place concrete roof and floor systems. The roofing and flooring systems may also include preset molds such that the walls, roofs, and floors can be assembled without skilled labor or the need for on-site measurements as all attachments (wall to wall, wall to floor, and wall to roof) are predetermined and anchor-bolted in place in a preformatted, interlocking system.

Figure 7:
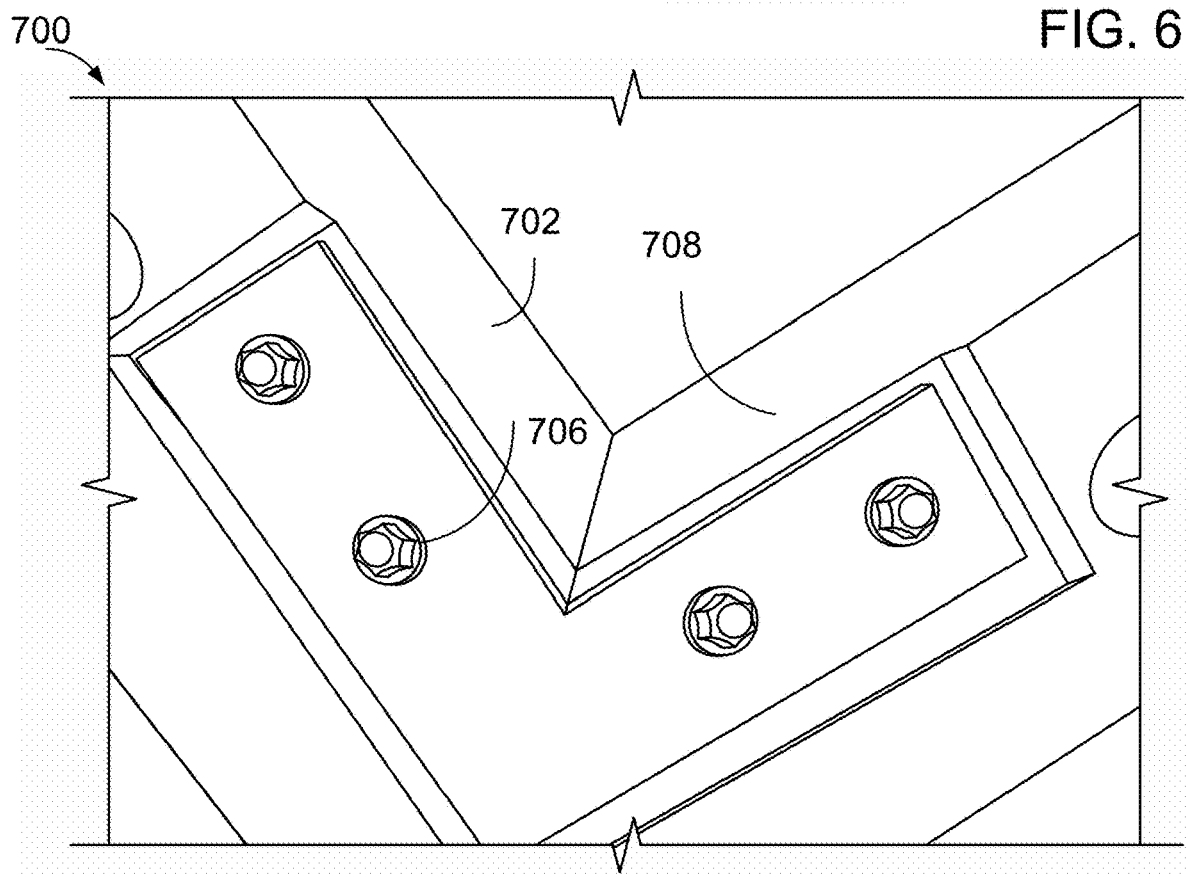
FIG. 7 shows a bolted connection for use with wall panels according to the present disclosure.
Figure 8:
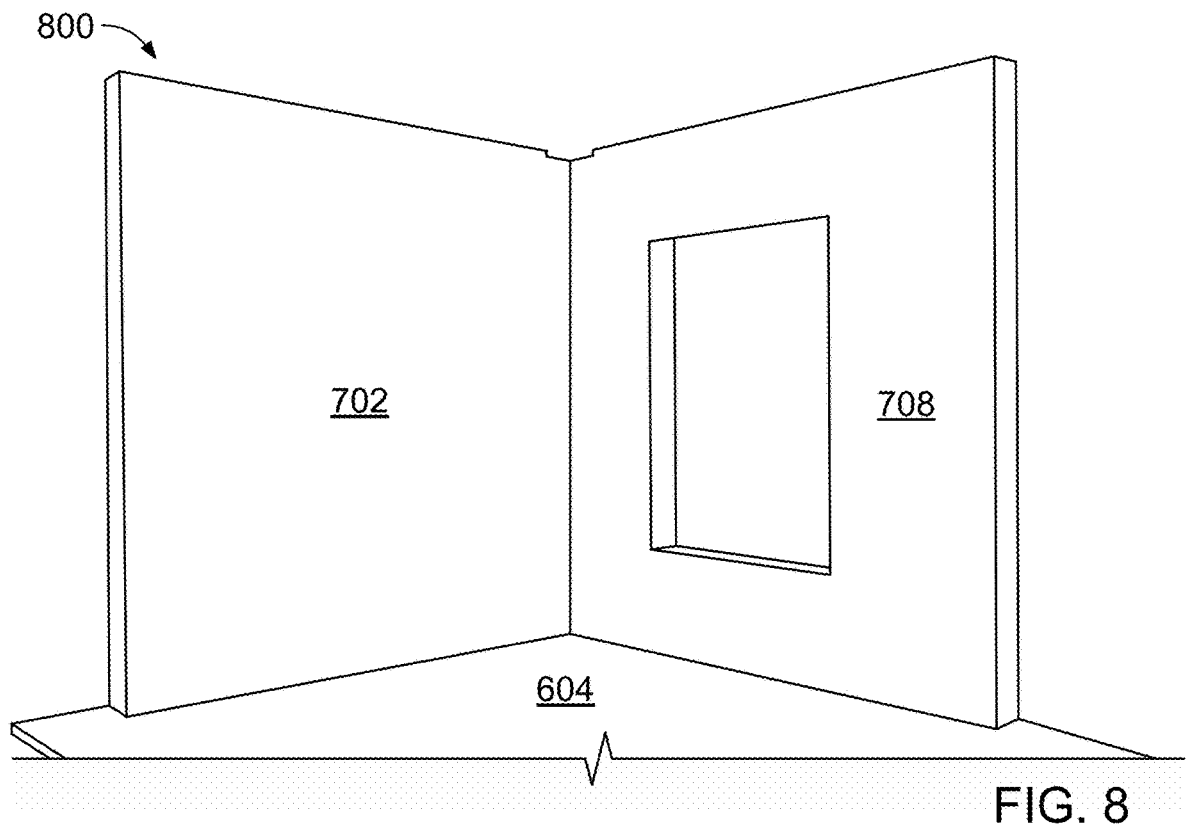
FIGS. 8-9 show wall panels according to the present disclosure after being erected and bolted.
Figure 9:
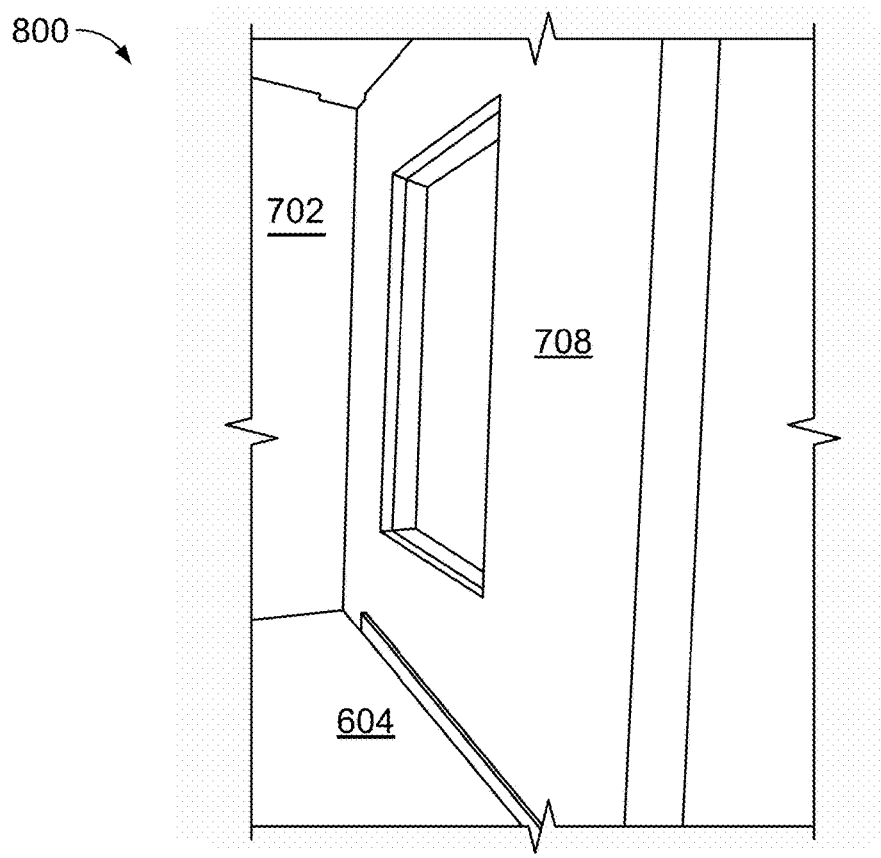

FIG. 7 shows a bolted connection 700 for use with wall panels 702 and 708 according to the present disclosure. This bolted connection 700 avoids the need for a traditionally installed weld plate and reduces the need for highly skilled onsite labor. In this section of the wall panel 702 with a bolted connection 700, the insulation layer is reduced or eliminated to create a solid concrete section that can be drilled into and secured with large diameter tapcon (LDT) anchors 706. For example, the LDTs may be sized to meet necessary seismic shear strength requirements (e.g., approximately ⅝"×6" or ⅝"×8"). FIGS. 8-9 show the wall panels 702 and 708 after being erected and bolted with LDT anchors 706.

The preset mold system and wall panels disclosed herein allow for construction of buildings story by story, such that a first set of wall panels can be positioned to form a perimeter at a first elevation (e.g., ground level) and a second set of wall panels can be lifted and positioned to form a perimeter over the first set of wall panels at a higher second elevation (e.g., a second, third, or fourth story). The flooring for each story may be laid down after each set of wall panels is positioned; for example, the flooring for the second story can be laid down on top of the first set of wall panels before the second set of wall panels are positioned. The roofing can then be applied upon completion of positioning the last set of wall panels on the top story of the building.

Figure 10A:
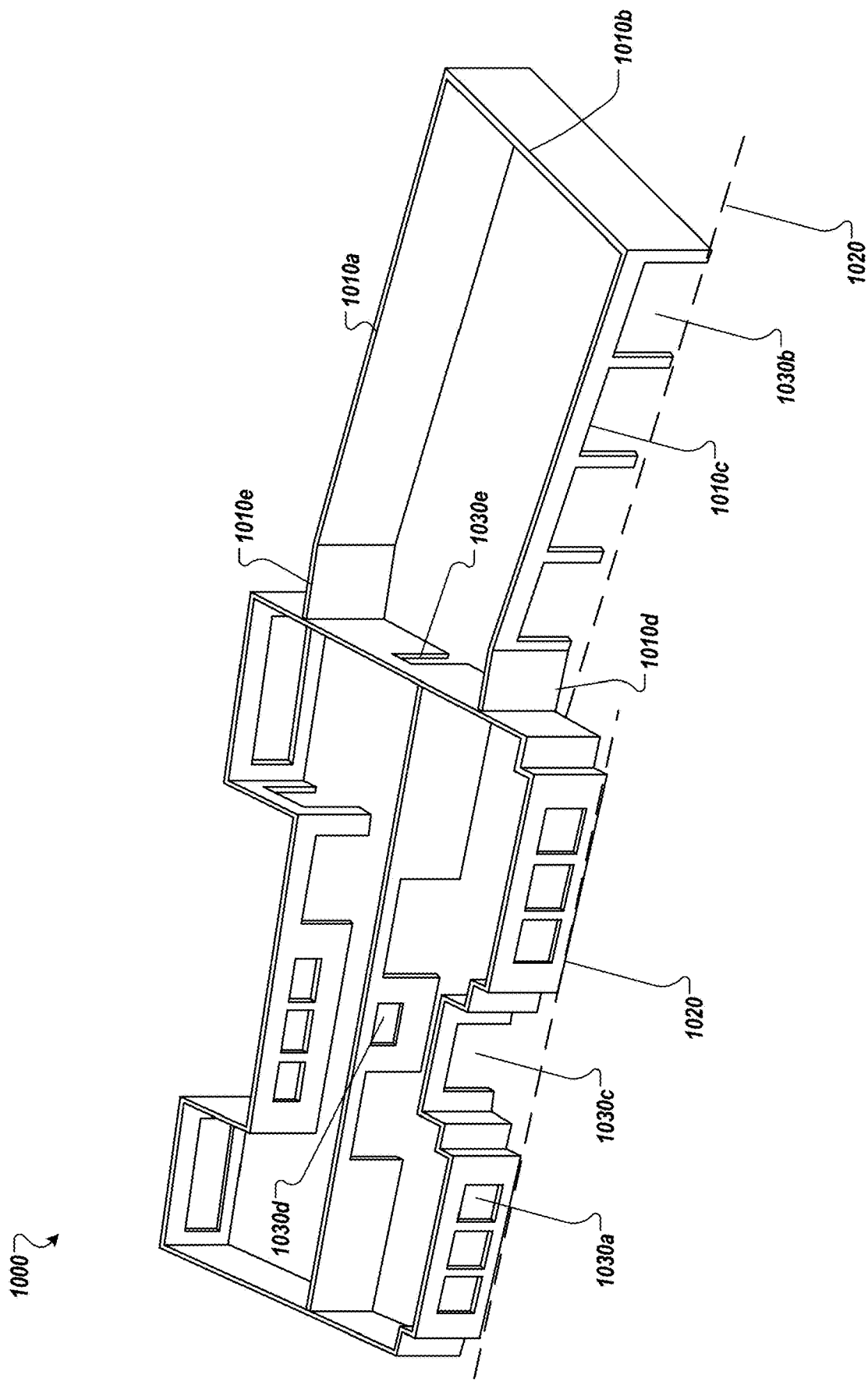
FIGS. 10A-C depict consecutive layers of the building being constructed.
Figure 10B:
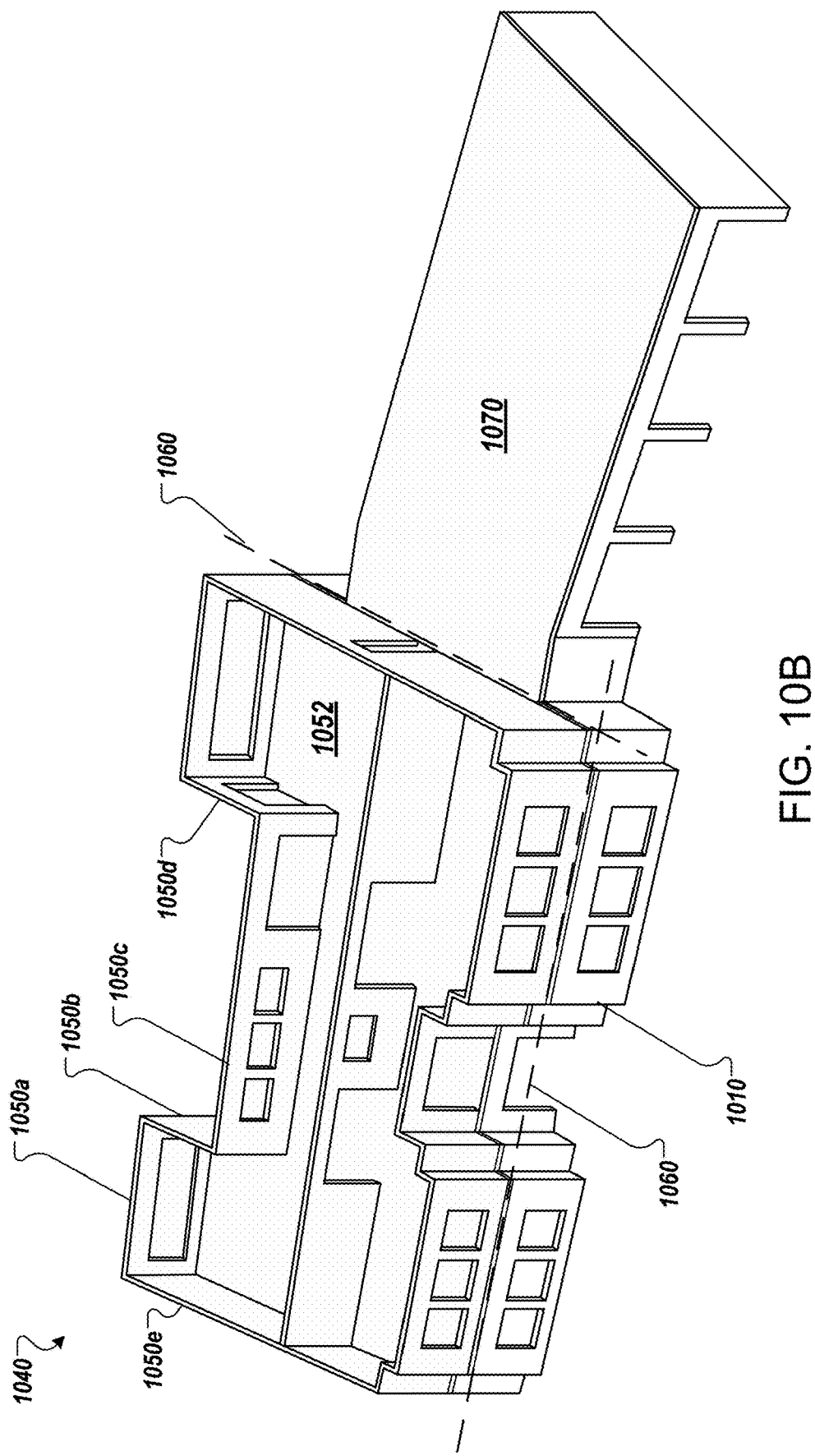
Figure 10C:
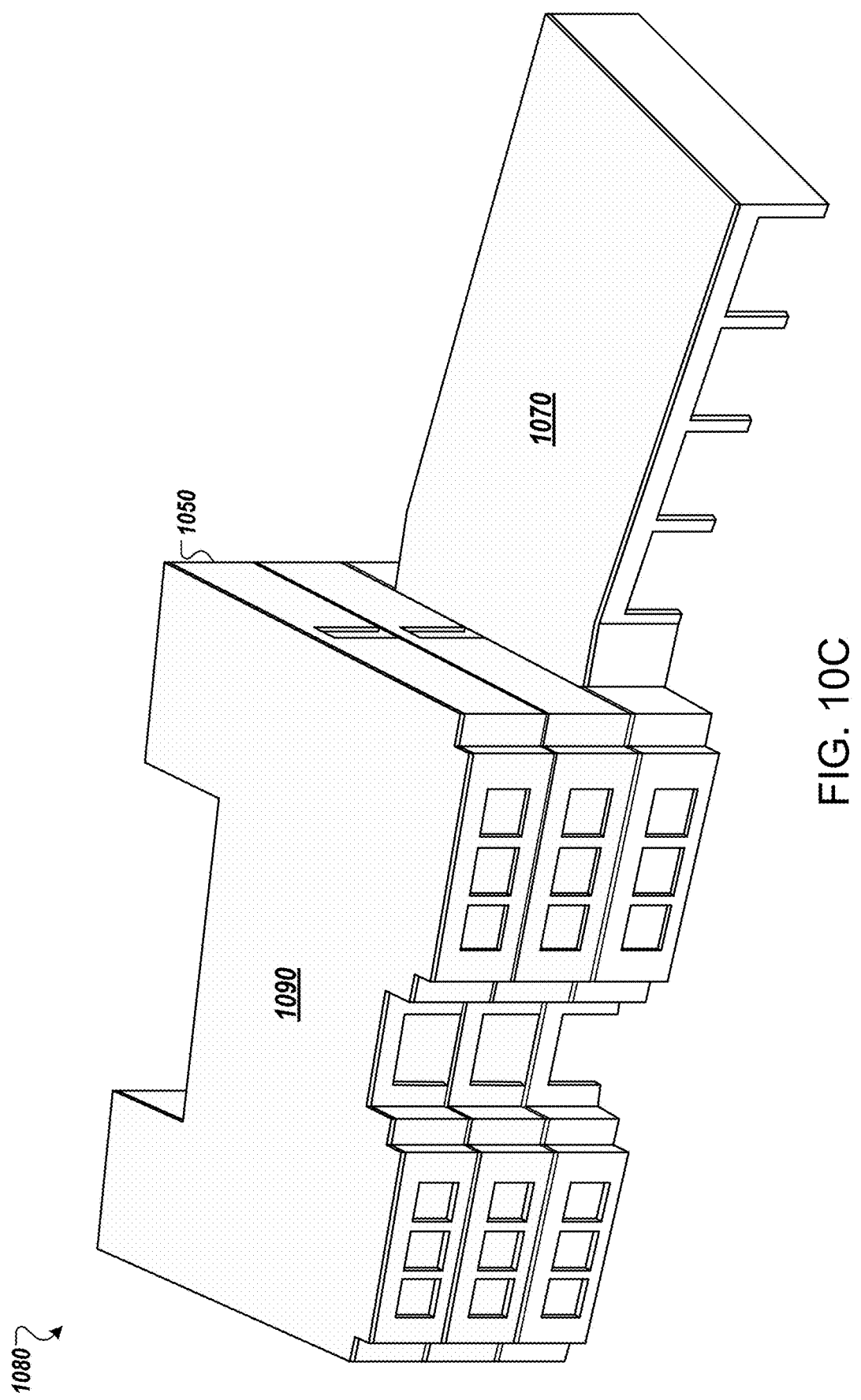

FIG. 12 is a flow diagram of a process 1200 for constructing a building. For example, building system 600 can carry out the process 1200. FIGS. 10A-C depict consecutive layers of the building being constructed.

The building system 600 can form a first sandwich wall panel from a first preset mold and a second sandwich wall panel from a second preset mold (1210). Each of the first and second sandwich wall panels, e.g., wall panels 702 and 708, can include two fiber-reinforced concrete layers, e.g., concrete layers 104, an insulation layer between the two fiber-reinforced concrete layers, e.g., insulation layer 102, at least one connector extending through the insulation layer and concrete layers, e.g., connector 106, and a solid fiber-reinforced concrete section.

The building system 600 can bolt the first sandwich wall panel to the second sandwich wall panel by drilling at least one large diameter tapcon anchor through the solid fiber-reinforced concrete sections of the first and second sandwich wall panels (1220). Step 1220 can result in the building system 600 forming a corner, such as corner walls 800 of FIG. 8, of a building, e.g., where two walls 702 and 708 meet at an angle above floor 604. FIG. 9 provides another perspective of corner walls 800.

In some implementations, the building system 600 bolts more than two sandwich wall panels together in order to form a complete wall around the building. For example, FIG. 10A includes many wall panels 1010a-e that together form the ground-floor exterior of a building 1000.

In some implementations, the process continues with the building system 600 positioning a first set of wall panels at a first elevation (1230). The first set of wall panels can include the first sandwich wall panel and the second sandwich wall panel. FIG. 10A shows a ground-floor level of the building 1000, which can include a first set of panels 1010a-e at a first elevation 1020, marked by the dashed lines. Although only five panels of the first set of panels 1010a-e are referenced, there can be any number, e.g., ten or fifty, wall panels. The panels can include openings 1030 for windows 1030a, garage doors 1030b, entrance doors 1030c, internal windows 1030d and internal doors 1030e in the building, and the like.

After positioning the first set of wall panels, the building system 600 can install a floor over the first set of wall panels (1240). FIG. 10B shows a building 1040, which has a first-floor level added to the building of FIG. 10A. The building 1040 has a floor 1052 over the first set of wall panels 1010.

After installing the floor, the building system 600 can lift and position a second set of wall panels over the first set of wall panels at a second elevation higher than the first elevation (1250). The building 1040 includes a second set of wall panels 1050a-e at a second elevation 1060, marked by the dashed lines. Although only five panels of the second set of panels 1050a-e are referenced, there can be any number, e.g., ten or fifty, wall panels. Measured from the ground, the second elevation 1060 is greater than the first elevation 1020.

After lifting and positioning the second set of wall panels, the building system 600 can install a roof over the second set of wall panels (1260). FIGS. 10B and 10C both display roofs. FIG. 10B shows a roof 1070 over a portion of the first set of wall panels 1010. FIG. 10C shows a building 1080, which has a roof 1090 over a portion of the building 1040 from FIG. 10B. In this example, the roof 1090 goes over the second set of wall panels 1050.

In some implementations, the process 1200 can include additional steps, fewer steps, or some of the steps can be divided into multiple steps. For example, step 1220 can be repeated multiple times for more than two sandwich wall panels depending on how many wall panels form a story of a building. Steps 1250 and 1260 can be repeated multiple times for different portions of the building, in order to create a building that has roofs at multiple heights over different portions of the building, such as roofs 1070 and 1090 on building 1080 from FIG. 10*c*.

Manufacturing processes according to the present disclosure eliminate the need for casting in structural steel to weld the panels together as described above, the elimination of which can help prevent fire hazards. Due to the preset mold processes described herein, all wall panel coordinates can be predetermined by engineering and cast accordingly. This allows the wall panels to be produced without the need for skilled labor and further allows the wall panels and the structural steel floors and roofs to be erected and bolted together without the use of measuring tools (e.g., tape measure) or using a "stringer layout." This again reduces or eliminates the need for skilled labor on construction sites and standardizes and simplifies the construction building process.

The embodiments of the present disclosure may be used for a wide variety of residential building structures, including without limitation, single-family homes, multi-family homes, condominiums, apartments. Further, embodiments may be used for commercial and other structures, for example, car washes, storage garages, cladding panels for high-rise buildings, low-rise cold storage, low-rise office buildings, medical and dental offices, strip malls, schools, hotels, manufacturing centers, data centers, gun ranges, retail centers, municipal buildings, low-rise warehousing, grocery stores, beverage packing and production buildings, restaurants, and basements. Some or all windows, doors, and mechanicals (e.g., electrical and plumbing) for these residential and/or commercial structures may be cast into the wall during the manufacture and construction process.

Many modifications and other embodiments of the disclosure set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing a preset mold having a length in a first lateral dimension and a width in a second lateral dimension;
forming a first concrete layer by pouring a wet concrete mix containing fibrous material into the preset mold;
while the concrete mix is still wet, installing an insulation layer and one or more connectors such that the insulation layer and connectors embed into the first concrete layer in the preset mold, where at least one of: a length the insulation layer is less than the length of the preset mold, or a width of the insulation layer is less than the width of the preset mold;
forming a second concrete layer by pouring the wet concrete mix containing fibrous material over the insulation layer and the connectors in the preset mold;
placing at least one lifting anchor in a region of the preset mold that is adjacent to a recess in a perimeter of the insulation layer, such that a portion of the at least one lifting anchor is exposed from the concrete; and
allowing the first and second concrete layers to cure to form a sandwich wall panel with composite action between the first and second concrete layers, the insulation layer, and the connectors.

2. The method of claim 1, where the preset mold defines an opening.

3. The method of claim 2 further comprising forming a window in the sandwich wall panel from the opening in the preset mold.

4. The method of claim 1 further comprising lifting the sandwich wall panel from the preset mold.

5. The method of claim 1, where the first and second concrete layers form a solid concrete section that fully covers the insulation layer.

6. The method of claim 1, wherein the at least one lifting anchor connects to a hairpin rebar.

7. The method of claim 1, where the insulation layer comprises one or more recessed regions along a perimeter of the insulation layer that are recessed inward, thereby permitting formation of one or more solid concrete regions within the recessed regions.

8. The method of claim 1, where the first concrete layer and the second concrete layer are each less than or equal to two inches in thickness.

9. The method of claim 8, where the insulation layer is at least four inches thick.

10. The method of claim 1, where the first concrete layer and the second concrete layer comprise polypropylene fibers.

11. The method of claim 1, where the first concrete layer and the second concrete layer comprise polyethylene fibers.

12. The method of claim 1, where the fibrous material is configured to form air pockets when exposed to heat.

13. The method of claim 1, where the sandwich wall panel does not have reinforcing steel materials.

14. The method of claim 1 further comprising, while the concrete mix is still wet, placing a conduit box in the first concrete layer or the second concrete layer.

15. The method of claim 14 further comprising, while the concrete mix is still wet, placing conduit that connects to the conduit box in the first concrete layer or the second concrete layer.

16. The method of claim 1, wherein the preset mold comprises welded metal.

17. The method of claim 1, where the sandwich wall panel is a first sandwich wall panel, and where the method further comprises attaching the first sandwich wall panel to a second sandwich wall panel, where attaching comprises:
   positioning the first and second sandwich wall panels adjacent to each other;
   positioning a connector over upper edges of both the first sandwich wall panel and the second sandwich wall panel such that the connector extends between the first sandwich wall panel and the second sandwich wall panel; and
   affixing the connector to the upper edges of both the first sandwich wall panel and the second sandwich wall panel.

18. A construction method using concrete composite wall panels, the method comprising:
   obtaining a plurality of concrete composite wall panels (CCWP), each CCWP comprising:
      a first concrete layer and a second concrete layer,
      an insulation layer disposed between the first concrete layer and the second concrete layer, where a perimeter edge of the insulation layer is inset from respective perimeter edges of the first and second concrete layers and an entirety of the perimeter edge of the insulation layer is covered by a cap of concrete,
      a plurality of connectors spaced throughout the wall panel, each connector extending from the first concrete layer through the insulation layer and into the second concrete layer,
      a lifting anchor embedded in a first region at an upper end of the wall panel at which the insulation layer is recessed further inward than the inset, thereby forming a first area of solid concrete extending between the first and second concrete layers; and
      a second region at a lower end of the wall panel at which the insulation layer is recessed further inward than the inset, thereby forming a second area of solid concrete extending between the first and second concrete layers, the second region sized to accept at least two tapcon anchors;
   positioning a first CCWP adjacent to a second CCWP using respective lifting anchors of each CCWP; and
   securing the respective lower end of each of the first CCWP and the second CCWP to tapcon anchors in a foundation, where the tapcon anchors are secured within a respective second region of each CCWP.

19. The method of claim 18, further comprising:
   positioning a connector over upper edges of both the first CCWP and the second CCWP such that the connector extends between the first CCWP and the second CCWP; and
   affixing the connector to the upper edges of both the first CCWP and the second CCWP.

20. A method comprising:
   providing a concrete forming means having a length in a first lateral dimension and a width in a second lateral dimension;
   forming a first concrete layer by pouring a wet concrete mix containing fibrous material into the concrete forming means;
   while the concrete mix is still wet, installing an insulation layer and one or more connection means such that the insulation layer and the one or more connection means embed into the first concrete layer in the concrete forming means, where at least one of: a length of the insulation layer is less than the length of the concrete forming means, or a width of the insulation layer is less than the width of the concrete forming means;
   forming a second concrete layer by pouring the wet concrete mix containing a fibrous material over the insulation layer and the one or more connection means in the concrete forming means;
   placing at least one lifting anchor in a region of the concrete forming means that is adjacent to a recess in a perimeter of the insulation layer, such that a portion of the at least one lifting anchor is exposed from the concrete; and
   allowing the first and second concrete layers to cure.

* * * * *